T. Carter.
Sawyers' Rule.

No. 71,979. Patented Dec. 10, 1867.

Fig. 1

Fig. 2

Witnesses
Inventor
T. Carter
Per Munn & Co.
Attorneys

United States Patent Office.

THOMAS CARTER, OF LOUISVILLE, KENTUCKY.

Letters Patent No. 71,979, dated December 10, 1867.

---

IMPROVEMENT IN SAWYERS' RULES.

---

The Schedule referred to in these Letters Patent and making part of the same.

---

TO ALL WHOM IT MAY CONCERN:

Be it known that I, THOMAS CARTER, of Louisville, in the county of Jefferson, and State of Kentucky, have invented a new and improved Sawyer's Rule; and I do hereby declare that the following is a full, clear, and exact description thereof, which will enable others skilled in the art to make and use the same, reference being had to the accompanying drawings, forming part of this specification.

This invention relates to an improved sawyer's rule, and consists of a rule on which is a scale, showing at a glance the number of board or plank, of any desired thickness, which can be sawn from a log of any given diameter. In the accompanying drawings—

Figures 1 and 2 are reverse views of a rule twelve inches in length and three inches in depth, having my scales marked thereon.

Similar letters of reference indicate corresponding parts.

I do not claim the rule itself, or any ordinary scale thereon, or subdivisions thereof. My rule may be of any dimensions, and will be graduated accordingly. It may be constructed of wood, brass, or any suitable material.

My graduations may be the only ones on the rule, or it may contain my graduations in addition to those ordinarily used, or any other scale or subdivisions. The size rule which I believe will be found most convenient, is thirty inches by three. The graduations are of such a character that the outside slab of the log being supposed removed, the diameter of the log being ascertained and read off, the column of inches, marked A, say 9, if it be desired to ascertain the number of planks of one-half inch thickness which can be cut from such log, the number in the half-inch column, i. e., in the column marked B, directly over the figure 9 in the column A, gives the required number, viz, 12. The number of planks, respectively one and one-quarter inch, two inches, and two and three-quarter inches, which can be cut from a nine-inch log, is in like manner found by reading from columns F, I, and M respectively, the numbers respectively directly over the figure 9 in column A, viz, 6, 4, and 3, respectively. So from a log ten and a half inches in diameter, the number of plank of the respective thicknesses of one-half, five-eighths, one and one-quarter, one and one-half, and three and one-quarter inches respectively, will be found in the columns B, C, F, G, and O respectively, directly over the 10½ line on the vernier scale of column A, viz, 14, 12, 7, 6, and 3 respectively. The numbers 3, 3¼, 4, 5, 6, 7, 8, 9, 10, 11, 12, 13, 14, 15, 16, and 17, across the rule at the head of each column, and to the left of the letters B C D E F G H I K L M N O P Q R, respectively indicate the number of turns to be given to the screws after each cut to bring the log into position for the next cut. Thus, cutting planks say one and one-half inch thick, seven turns or revolutions are to be given to the screws of the log-carriage, after cutting each plank, to bring the log into position for the next cut, and five planks one and one-half inch thick will be got from a log eight and three-quarter inches in diameter. So thirteen turns cut planks three inches, seventeen turns, four inches, as seen from the scale. The scale employed may be decimal instead of fractional, and the columns will be adjusted accordingly.

I claim as new, and desire to secure by Letters Patent—

1. A scale so constructed and adjusted that any two of the three quantities of the thickness of the planks, the diameter of the log, and the number of the planks cut or to be cut from the log being given, the third of said quantities is read off from the scale in the manner substantially as above set forth and described.

2. A scale exhibiting the number of turns to be given to the screws of the log-carriage for cutting plank or boards of any desired thickness.

THOMAS CARTER.

Witnesses:
LLOYD HARRIS,
J. G. DOWNING.